(12) United States Patent
Lowther et al.

(10) Patent No.: US 8,326,351 B2
(45) Date of Patent: Dec. 4, 2012

(54) MULTI USER TEXT PBX WITH MULTI MESSAGE SYSTEM CAPABILITIES

(76) Inventors: Kelly W. Lowther, Lee, NH (US); Jesse A. Lowther, Lee, NH (US); Christopher B. Lowther, Lee, NH (US)

( * ) Notice: Subject to any disclaimer, the term of this patent is extended or adjusted under 35 U.S.C. 154(b) by 0 days.

(21) Appl. No.: 13/200,240

(22) Filed: Sep. 21, 2011

(65) Prior Publication Data
US 2012/0071180 A1    Mar. 22, 2012

Related U.S. Application Data

(60) Provisional application No. 61/385,407, filed on Sep. 22, 2010.

(51) Int. Cl.
*H04M 1/00* (2006.01)
(52) U.S. Cl. ............... 455/554.1; 455/462; 455/466; 370/328; 370/338; 370/401
(58) Field of Classification Search ............ 455/462, 455/466, 554.1; 370/328, 338, 401
See application file for complete search history.

(56) References Cited

U.S. PATENT DOCUMENTS

| | | | | |
|---|---|---|---|---|
| 8,121,626 | B1 * | 2/2012 | Kirchhoff et al. | 455/466 |
| 2008/0059288 | A1 * | 3/2008 | Kokernak | 705/10 |
| 2011/0286467 | A1 * | 11/2011 | Lowther et al. | 370/401 |

\* cited by examiner

*Primary Examiner* — Amancio Gonzalez
(74) *Attorney, Agent, or Firm* — PCT Law Group, PLLC

(57) ABSTRACT

Systems, methods and computer program products for facilitating the communication of business-related (SMS) messages from PBXs to wireless devices are disclosed. In an aspect of the present invention, a service provider offers a web, cloud-based service that enables an operator within an organization to have a high volume of two-way communications with an unlimited number of individuals—through SMS texting, instant messaging, pager, web browser, email and voice—all controlled from a single intuitive browser interface tool. Additionally, a complete history of all communications and real time statistics are available to either the operator or an administrator of the organization.

20 Claims, 9 Drawing Sheets

MULTI USER TEXT PBX WITH MULTI MESSAGE SYSTEM CAPABILITIES

CROSS REFERENCE TO RELATED APPLICATION

This Application claims priority to co-pending U.S. Provisional Patent Application No. 61/385,407, titled "Multi User Text PBX With Multi Message System Capabilities," filed on Sep. 22, 2010, which is hereby incorporated by reference as to its entire contents. The Application is related to co-pending, co-owned U.S. patent application Ser. Nos.: 13/112,352, titled "Private Branch Exchange for Communicating Messages to and from Wireless Devices," filed May 20, 2011; and Ser. No. 13/370,306, titled "Text Communications Across Wireless Devices Using Private Exchange," filed Feb. 10, 2012.

BACKGROUND OF THE INVENTION

1. Field of the Invention

The present invention generally relates to wireless communications, and more particularly to systems, methods and computer program products for facilitating communications between private branch exchanges and mobile devices.

2. Related Art

In today's technological environment, Short Message Service (SMS) or "text messaging" is the most common used data application in the world—more so than email! That is, it has been estimated that as far back as 2008, over 4.1 trillion text messages were sent. And, as far back as 2006, text messaging was an US$80 billion global industry. Currently over 4 billion texts a day are sent in the United States. Some sources state that there are approximately 2.4 billion active users of text messaging which represents 74% of all mobile telephone subscribers.

The popularity of SMS is not surprising given the growth of the mobile industry as a whole. In 2010, according to the International Telecommunication Union (ITU), there were 5.3 billion mobile subscribers which represent approximately 77% of the world's population. In contrast, there were only 1.2 billion fixed telephone lines in the world during the same time period. The use of text messaging, however, remains largely personal. Such messages are typically "consumer-to-consumer" and are of a personal nature. That is, an overwhelming majority of text messages sent involve an individual subscriber sending a short (e.g., up to 160 7-bit characters) and personal message to another individual subscriber.

Businesses, on the other hand, who typically employ private branch exchanges (PBXs), have not realized the full power and reach of SMS. PBXs, which often incorporate telephones, fax machines, modems, and the like, make connections among the internal telephones of a private organization—usually a commercial business—and also connect them to the public switched telephone network (PSTN) via trunk lines. As of today, text messaging between businesses and mobile subscribers have mostly involved content delivery and entertainment services (e.g., TV contest voting). Yet, according to the ITU, text messages are read on average within four minutes compared to 48 hours with email, and while 65% of email is spam, less than 10% of SMS is spam. This presents significant new avenues for businesses to communicate with existing and potential customers for increased revenue opportunities.

Given the foregoing, what is needed are systems, methods and computer program products for facilitating the communication of business-related messages from PBXs to wireless devices.

BRIEF DESCRIPTION OF THE INVENTION

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing systems, methods and computer program products for facilitating the communication of business-related (SMS) messages from PBXs to wireless devices.

In an aspect of the present invention, a service provider offers a web, cloud-based service that enables an organization (e.g., a university, a company/business enterprise or local, state or federal government department or agency, a charitable entity or any other type of organization or entity) to have a large number of the organization's personnel (e.g., call center operators, telemarketers, fundraisers, customer service representatives, etc.) handle a large volume of incoming SMS messages from a variety of mobile telephone subscribers capable of receiving such SMS messages. (Such telephone subscribers capable of receiving such SMS messages from the organization may be its actual or potential customers, clients, patients, constituents and/or the like, utilizing a mobile telephone, a desktop computer, a laptop computer, a personal digital assistant (PDA), a tablet or mobile computer, any commercially-available intelligent communications device, or the like, and are collectively referred to herein as "endpoints.")

In an aspect, the system of the present invention allows the flow of the SMS messages to the endpoints to be controlled in real time at the front end by an organizational administrator and divided among the organization's personnel in a variety of ways. In such an aspect, each of the organization's personnel may handle their allocated portion of the SMS message flow to (bi-directionally) communicate with multiple endpoints, and easily manage each conversation in a multi-featured and scalable workspace.

In yet another aspect, the present invention allows conversations or dialogues to be given either time values or priority values and presented to the organization's personnel charged with communicating with endpoints accordingly. Individual endpoints can be addressed or multiple endpoints selected and all addressed at the same time. Similarly, workflows or tasks can be easily divided into their own areas and managed accordingly.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

Figure 1:
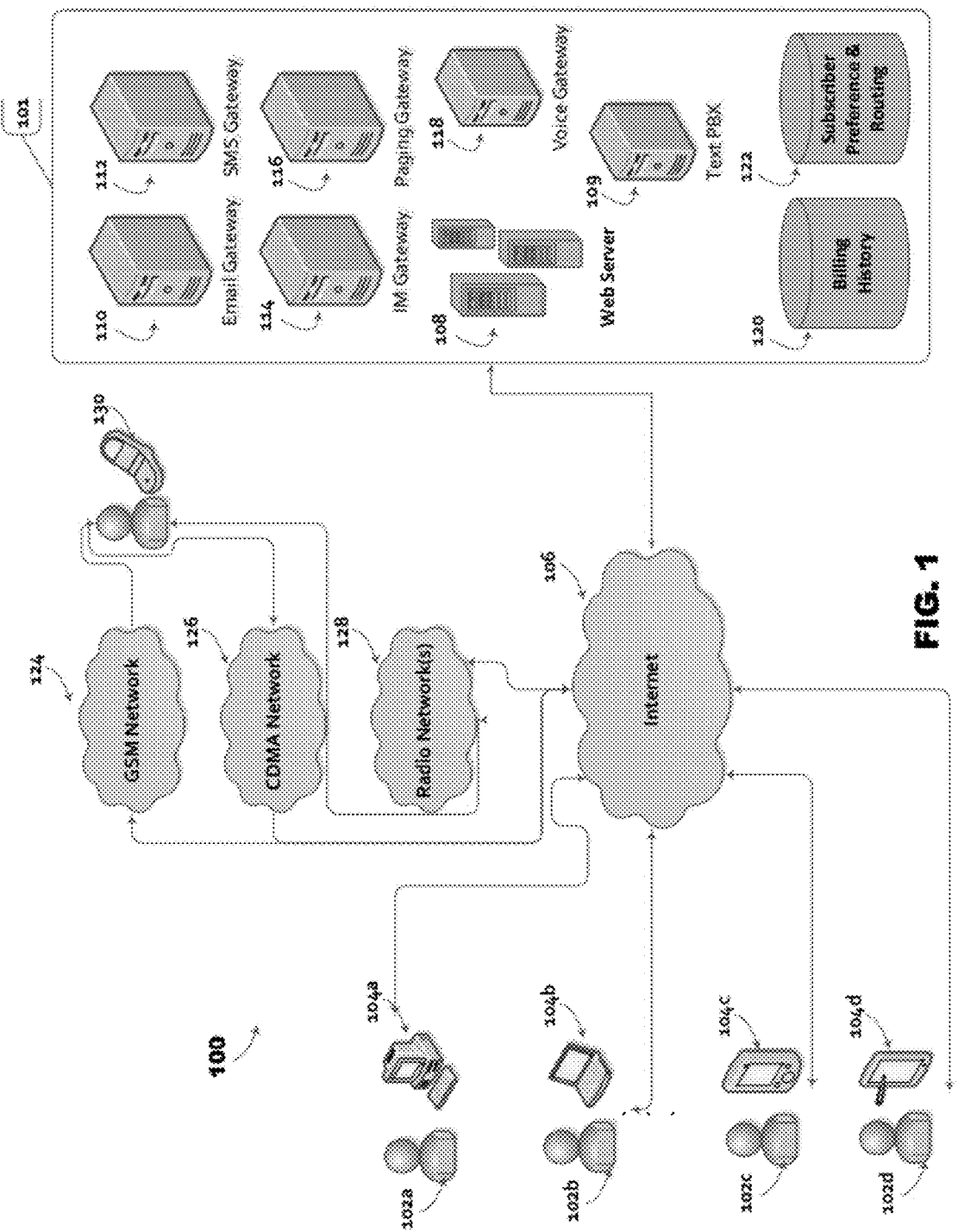
FIG. 1 is a block diagram of an exemplary system and method for facilitating the communication of business-related (SMS) messages from PBXs to wireless devices according to an aspect of the present invention.

The present invention is directed to systems, methods and computer program products for facilitating the communication of business-related (SMS) messages from PBXs to wireless devices.

In an aspect of the present invention, a service provider offers a web, cloud-based service that enables an operator within an organization to have a high volume of two-way communications with an unlimited number of individuals (endpoints)—through SMS texting, instant messaging, pager, web browser, email and voice—all controlled from a single intuitive browser interface tool. Each operator can turn over their workspace intact to another operator (i.e., during a shift change) so that work can continue. Additionally, a complete history of all communications and real time statistics are available to either the operator or an administrator.

In such an aspect of the present invention, the web cloud-based service may be utilized by any organization that schedules appointments and sends reminders to clients or patients, such as a medical practice, dental practice, chiropractic practice, barber shop, hair salon, spa, hotel, appliance repair service, library, delivery service, car rental service, auto body shop, car repair center, veterinary clinic and the like. Such organizations would use the SMS messaging application provided by the present invention to send reminders to patients or clients about pending appointments, as well as receive confirmations from such patients or clients that they will keep their previously-scheduled appointments. These organizations may also use the texting application to allow patients or clients to schedule appointments within available time slots without requiring a customer service representative from the organization to communicate "live" with the patients or clients.

In another aspect of the present invention, the web, cloud-based service may be utilized by any organization that seeks to communicate with customers via SMS, such as software development firms, consulting service firms and the like, to provide technical support or customer service by holding text conversations with such customers as they seek information, service or support.

In another aspect of the present invention, the web, cloud-based service may be utilized by any organization that seeks to maintain contact with a group of vehicles or individuals in the field (i.e., fleet management) such as delivery services, police and fire departments, emergency vehicle services, repair services, fuel delivery services and any other operation that would benefit from being able to maintain contact with field personnel.

The present invention is now described in more detail herein in terms of the above exemplary business services context. This is for convenience only and is not intended to limit the application of the present invention. In fact, after reading the following description, it will be apparent to those skilled in the relevant art(s) how to implement the following invention in alternative aspects.

Referring to FIG. 1, a block diagram illustrating an exemplary cloud-based, PBX-to-wireless devices communication system 100, according to an aspect of the present invention, is shown. Cloud-based, PBX-to-wireless devices communication system 100 includes a plurality of an organization's personnel users (e.g., call center operators, telemarketers, fundraisers, customer service representatives, etc.) 102 (shown as users 102a-d in FIG. 1) accessing—via a computing device 104 (shown as respective computing devices 104a-d in FIG. 1) and a network 106, such as the global, public Internet—an application service provider's cloud-based, PBX-to-wireless device (hardware and software) infrastructure 101. In various aspects, computing device 104 may be configured as a desktop computer 104a, a laptop computer 104b, a personal digital assistant (PDA) 104c, a tablet or mobile computer 104d, any commercially-available intelligent communications device, or the like.

As shown in FIG. 1, in an aspect of the present invention, an application service provider's cloud-based, PBX-to-wireless communications infrastructure 101 may include a web server 108, an email gateway 110, an SMS gateway 112, an instant message (IM) gateway 114, a paging gateway 116, a voice gateway 118, a billing history database 120 and a subscriber preference and routing database 122. In such an aspect, cloud-based, PBX-to-wireless communications infrastructure 101 would be connected to one or more telecommunications networks such as a GSM network 124, a CDMA network 126, a radio network 128 or the like. Such networks 124-128 would allow cloud-based, PBX-to-wireless communications infrastructure 101 to communicate with one or more endpoints 130 via SMS, voice, email and/or paging utilizing the appropriate one of gateways 110-118.

As will be appreciated by those skilled in the relevant art(s) after reading the description herein, in such an aspect, a service provider may allow access, on a free registration, paid subscriber and/or pay-per-use basis, to infrastructure 101 via one or more World-Wide Web (WWW) sites on Internet 106. Thus, system 100 is scaleable such that multiple organizations' personnel 102 may utilize it to facilitate the communication of business-related (SMS) messages from PBXs to wireless devices.

As will also be appreciated by those skilled in the relevant art(s), in an aspect, various (login, admin, account, information, resource, logout, payment, registration, communications, etc.) screens would be generated by server 108 in response to input from users 102 over Internet 106. That is, in such an aspect, server 108 is a typical Web server running a server application at a Web site which sends out Web pages in response to Hypertext Transfer Protocol (HTTP) or Hypertext Transfer Protocol Secured (HTTPS) requests from remote browsers on various devices 104 being used by various users 102. Thus, server 108 is able to provide a graphical user interface (GUI) to users 102 of system 100 in the form of Web pages. These Web pages sent to the user's PC, laptop, mobile device, PDA or the like device 104, and would result in the GUI being displayed.

As will also be appreciated by those skilled in the relevant art(s) after reading the description herein, alternate aspects of the present invention may include providing the tool for facilitating the communication of business-related (SMS)

messages from PBXs to wireless devices as a stand-alone system (e.g., installed on one PC) or as an enterprise system wherein all the components of infrastructure 101 are connected and communicate via an inter-corporate wide area network (WAN) or local area network (LAN), rather than as a Web service (i.e., application service provider (ASP) model) as shown in FIG. 1.

Figure 2:
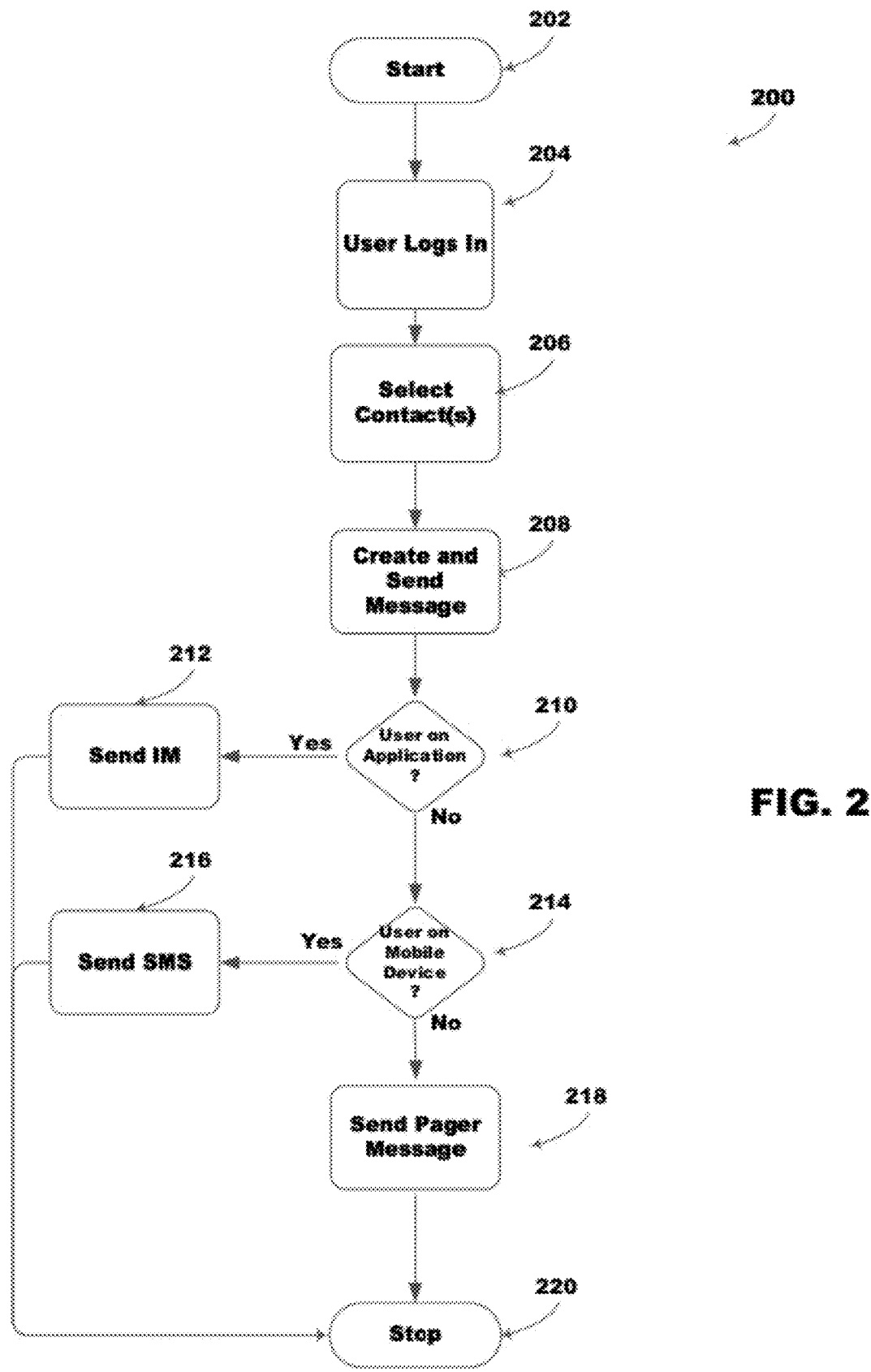
FIG. 2 is a flowchart illustrating operation of the system of FIG. 1, according to an aspect of the present invention.

Referring to FIG. 2, a flow diagram 200 describing the sending of a dialogue operation of system 100, according to an aspect of the present invention, is shown. Process 200 begins at step 202 and proceeds immediately to step 204.

In step 204, a user 102 utilizes a device 104 to log into the cloud-based application provided by PBX-to-wireless communications infrastructure 101. Such login process would involve user 102 accessing a GUI produced by server 108 and supplying a previously-issued (i.e., during an organization/user registration process) login and password. Then, in step 206, the user selects one or more contacts to which they desire to send a message. Such contact may be previously stored in database 122 or supplied "on the fly" during process 200.

In step 208, user 102 creates a message to be sent to the one or more contacts selected in step 206 and, upon finishing creating the message, indicates to the GUI they desire to actually send the message. Then, in step 210, it is determined whether the contact is also directly logged into the application provided by PBX-to-wireless communications infrastructure 101. If so, process 200 proceeds, in step 212, to send the created message to the contact 130 in the form of an IM via gateway 114.

If the determination of step 210 is negative, process 200 proceeds to step 214 where it is determined whether the contact is utilizing a mobile telephone (as endpoint 130). If so, the message is sent to the contact in the form of an SMS via gateway 112. The mobile (wireless) network operator (i.e., either network 124, 126 or 128) would then locate the mobile telephone of the contact. When the mobile device is located, the SMS is then sent to it. The network operator then sends a "Message Sent" message back to infrastructure 101, which reports it to user 102.

If the determination of step 214 is negative, process 200 proceeds to step 218 where the message is sent to the contact in the form of a pager message (i.e., by default) via gateway 116. The mobile network operator (i.e., either network 124, 126 or 128) would then locate the pager device (as endpoint 130) of the contact. When the pager device is located, the message is then sent to it. The network operator then sends a "Message Sent" message back to infrastructure 101, which reports it to user 102.

Process 200 then terminates as indicated by step 220. In an aspect of the present invention, each step of process 200 is logged and stored in to billing history database 120. Further, in an aspect of the present invention, any reply message sent by the contact (i.e., endpoint 130) to user 102 would follow the same process as described above. That is, any reply message is routed back to user 102 from endpoint 130, via network 124, 126 or 128 and the appropriate gateway 110-118. In such an aspect, when the reply message is successfully delivered to user 102, the applicable network operator sends a "Message Sent" message back to infrastructure 101, which reports it to endpoint 130.

As mentioned above, as will also be appreciated by those skilled in the relevant art(s) after reading the description herein, in an aspect, various GUI screens would be generated by server 108 in response to input from users 102 and endpoints 130 on their respective devices 104 over the Internet 106. In an aspect, such GUI would include screens to allow users 102 and endpoints 130 to: (1) Create a new dialogue; (2) Create a new contact; (3) Edit existing contacts; (4) Import a list of contacts from a file (e.g., a file previously stored on device 104 and uploaded to be stored in database 122 for later use in specifying one or more recipients of a future dialogue); (5) Create a new "roster" (i.e., a distribution list or subgroup) of contacts; (6) Edit existing rosters; (7) Send an immediate broadcast message; (8) Send a scheduled broadcast message at a user-selected future time and date; (9) Seek online help; (10) Select a screen layout to change the number of conversation boxes that appear in the active screen area; (11) Change their online status so as to be visible to the user's contact/roster list; (12) Edit their profile; (13) Edit their preferences; (14) Edit and view their billing information; and (15) Log out of the application.

Figure 3:
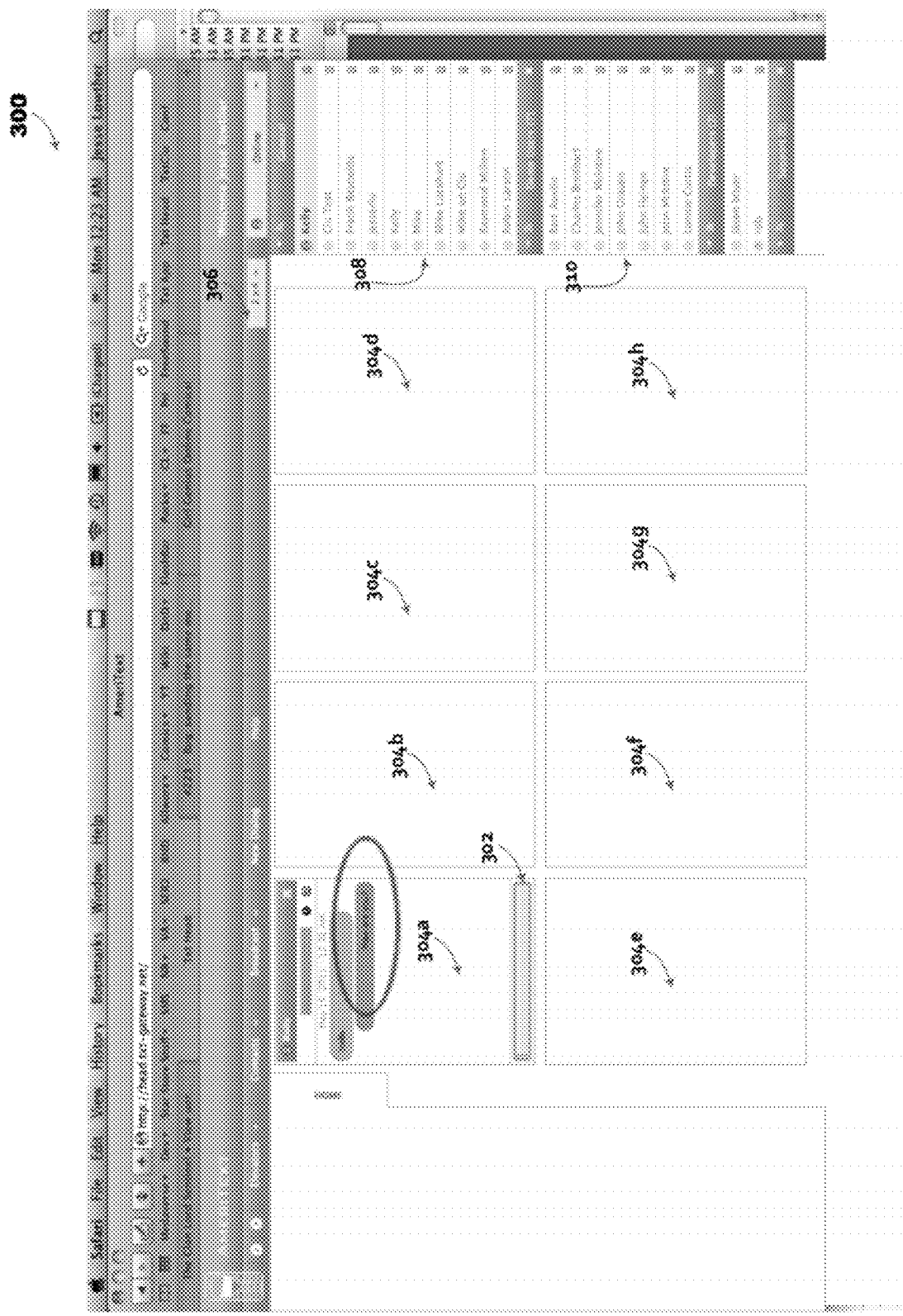
FIGS. 3-4 are screenshots illustrating exemplary graphical user interfaces, according to various aspects of the present invention.

Referring to FIG. 3, an exemplary dialogue graphical user interface screen 300, as may be provided to user 102 (e.g., during message creation step 208 of process 200) in an aspect of the present invention, is shown. Dialogue graphical user interface screen 300 includes a text input area 302 for user 102 to input (i.e., type or paste) text to create an SMS, IM, email or pager message to an endpoint 130. Dialogue graphical user interface screen 300 also includes one or more conversation areas 304 (shown as areas 304a-h in FIG. 3) where user 102 can view previous messages sent to, and received from, endpoints 130. In an aspect, area 304 may be color coded to easily distinguish sent and received messages. Dialogue graphical user interface screen 300 also includes a layout selection drop down menu 306 such that a user 102 can select how many conversation areas 304 (and their geometric layout) simultaneously appear on their device 104 while using the application provided by infrastructure 101. Dialogue graphical user interface screen 300 also includes a contact list display area 308 and one or more roster display areas 310.

Figure 4:
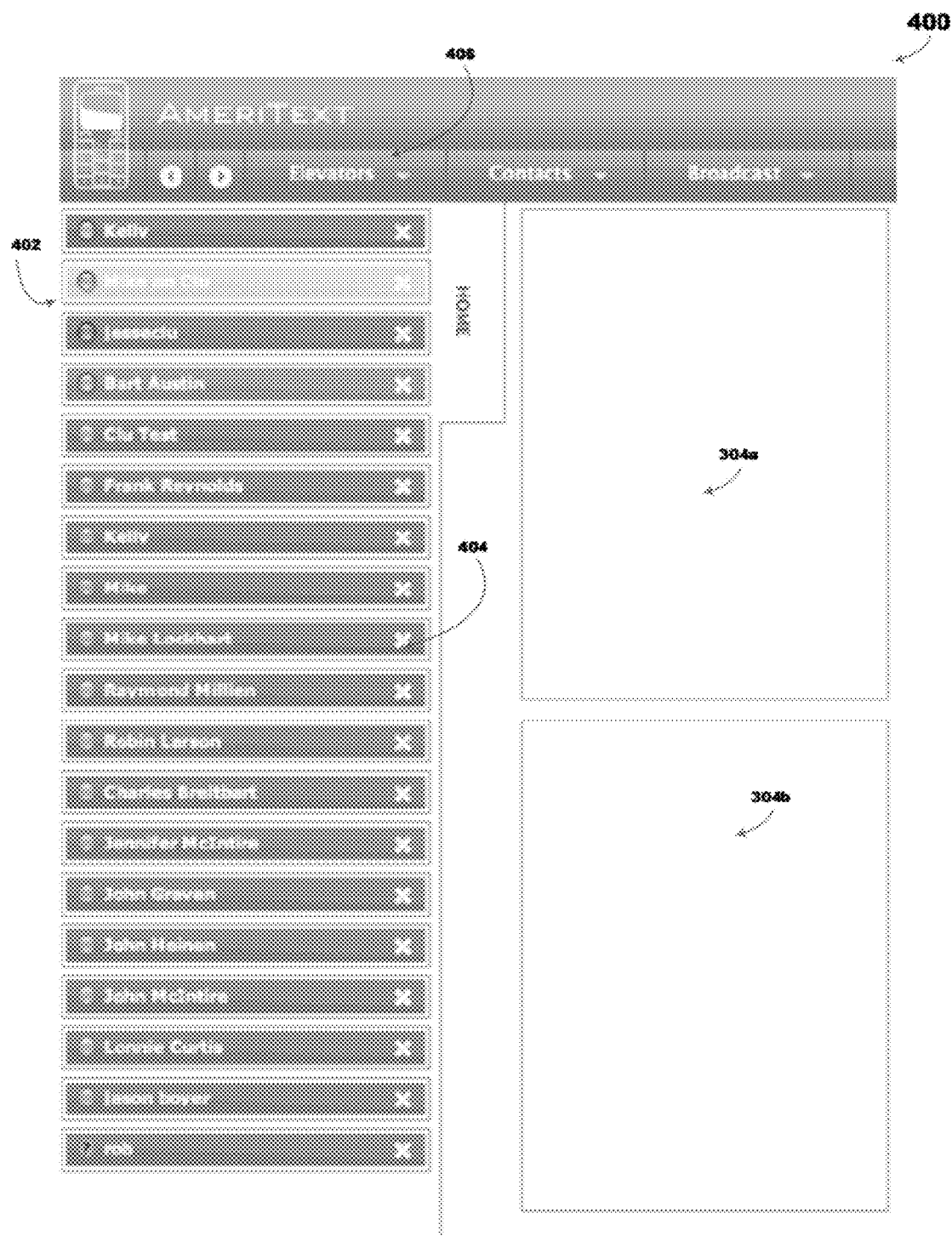

In an alternate aspect of the present invention, GUI screens would be generated by the application provided by infrastructure 101 to supply users 102 with an "elevator" user interface to manage simultaneous dialogues (i.e., conversations) with multiple (i.e., hundreds) of endpoints 130. Such elevator user interface is explained below while making reference to FIG. 4, which is an exemplary elevator user interface screen 400 that may be provided to user 102 in aspects of the present invention.

In an aspect, elevator user interface 400 consists of a long column (elevator) 402 designed to list endpoints 130 from which user 102 may select and hold conversations with at any time. In an aspect, long column of contacts 402 of interface 400 is ordered in descending order based upon the amount of time that has elapsed since endpoint 130 last communicated with user 102 or by some other criteria selected by user 102. This feature gives user 102 a clear indication of which endpoints 130 have waited the longest to communicate with user 102 or are the most important to the organization. This effectively makes the elevator a queue for endpoints 130 who are waiting to communicate with user 102.

In such an aspect, user 102 can quickly and easily send endpoints 130 to elevator 402 by double-clicking an endpoint 130 from, for example, within contact list display area 308. User 102 may also easily retrieve endpoints from elevator 402 for placement in one of many active conversation areas 304 (shown as areas 304a-b in FIG. 4) by double-clicking on an endpoint 130 in elevator 402. User 102 can further decide where to place an endpoint 130 within elevator 402 by clicking on an endpoint 130 and dragging the endpoint 130 to a location in the active conversation area 304 area where user 102 wishes to have a conversation with endpoint 130. For further convenience, elevator user interface 400 may have a button that will add as many endpoints to the active area 304 as it can hold (based on, for example, the layout selected using layout selection drop down menu 306) and another button that will send all endpoints 130 in active area 304 back to elevator 402.

In an alternate aspect of the present invention, infrastructure 101 supplies users 102 with a multiple elevator user interface. In such an aspect, multiple elevators 402 give user 102 an ability to arrange their work flow. When a user 102 selects a different elevator 402, the dialog boxes 304 change in the active area to match those in the selected elevator 402.

In an aspect, endpoints 130 in an elevator are color-coded to reflect their current status and priority (as customized by a user 102 or the organization's administrator). For example, green status may mean an endpoint 130 was the most recent to send a message in the conversation and has been waiting from 1-30 seconds for user 102 to reply. Yellow status, for example, may mean endpoint 130 was the most recent to send a message in the conversation and has been waiting from 31-60 seconds for user 102 to reply. Red status, for example, may mean endpoint 130 was the most recent to send a message in the conversation and has been waiting longer than 60 seconds for user 102 to reply. Blue status, for example, may mean user 102 was the most recent to send a message in the conversation and has been waiting for endpoint 130 to reply for less than five minutes. Gray status, for example, may mean user 102 was the most recent to send a message in the conversation and has been waiting for endpoint 130 to reply for longer than five minutes and the conversation with endpoint 130 may be considered as being concluded.

In an aspect, elevator user interface 400 will order endpoints 130 in elevator 402 based upon status in the following order from top to bottom: red, yellow, green, blue, and gray. This gives user 102 a clear understanding of which endpoints 130 have been waiting the longest to communicate with user 102, as well as which endpoints are not likely to respond any further.

As endpoints 130 wait in elevator (queue) 402, their priority color will change as more time elapses until user 102 sends an endpoint 130 a message and the endpoint's color status changes accordingly. This is done to reflect that user 102 does not need to immediately communicate to that specific endpoint 130 as user 102 had the last word in the conversation and is awaiting a reply from the endpoint 130. In an aspect, each endpoint 130 has an "X" box 404 which user 102 can click on to close the conversation with the endpoint, removing it from elevator 402. In an aspect, elevator user interface 400 includes a drop down menu 406 such that multiple elevator 402 tabs are offered to user 102 for storing multiple elevators (queues) 402. User 102 can create and rename tabs in order to maintain separate lists of endpoints. In an aspect, a new tab with a new elevator 402 is also created when user 102 sends a broadcast message. The new elevator 402 will contain all of the recipients of the broadcast message to better enable management of the broadcast.

Figure 5:
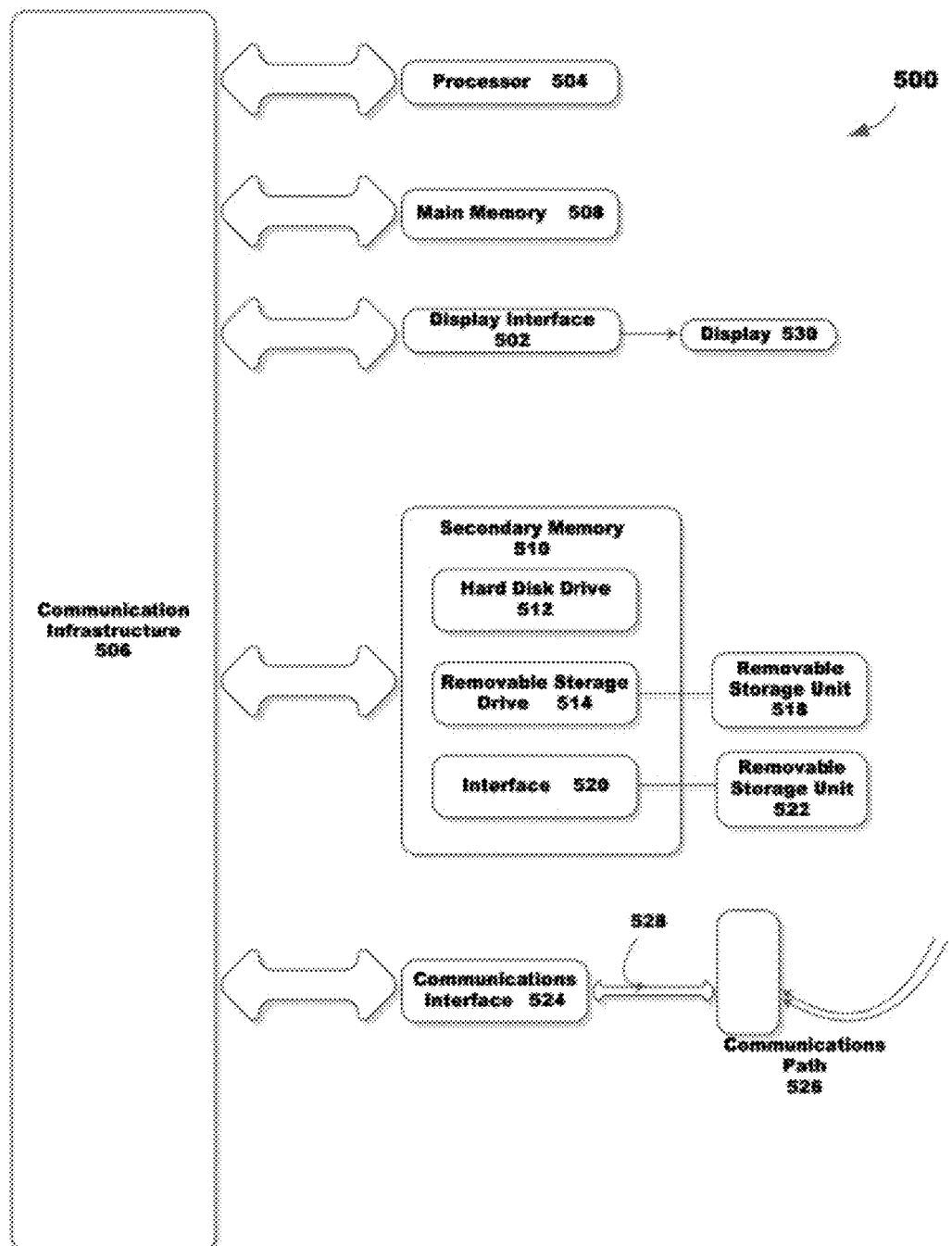
FIG. 5 is a block diagram of an exemplary computer system useful for implementing the present invention.

In one aspect, system 100 may be directed toward one or more computer systems capable of carrying out the functionality (e.g., process 200) described herein. An example of a computer system 500 is shown in FIG. 5. Computer system 500 includes one or more processors, such as processor 504. Processor 504 may be connected to a communication infrastructure 506, such as a communications bus or network, for example. Various software aspects are described in terms of this exemplary computer system. After reading this description, it will become apparent to a person skilled in the relevant art(s) how to implement the invention using other computer systems and/or architectures.

Computer system 500 can include a display interface 502 that forwards graphics, text and other data from communication infrastructure 506, or from a frame buffer (not shown), for display via display unit 530. Computer system 500 may also include a main memory 508, preferably a random access memory (RAM), and may further include a secondary memory 510. Secondary memory 510 may include, for example, a hard disk drive 512 and/or a removable storage drive 514, representing a floppy disk drive, a magnetic tape drive, or an optical disk drive, for example. Removable storage drive 514 reads from and/or writes to a removable storage unit 518 in a manner well known in the relevant art. Removable storage unit 518 represents a floppy disk, magnetic tape, or an optical disk, which is read by and written to by removable storage drive 514. As can be appreciated, removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface, such as may be found in video game devices, a removable memory chip, such as an erasable programmable read only memory (EPROM), or programmable read only memory (PROM), and associated socket and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of a communications interface 524 may include a modem, a network interface such as an Ethernet card, a communications port, and a Personal Computer Memory Card International Association (PCMCIA) slot and card. Software and data transferred via communications interface 524 are in the form of non-transitory signals 528 which may be electronic, electromagnetic, optical or other signals capable of being received by communications interface 524. Signals 528 may be provided to communications interface 524 via a communications path or channel 526. Channel 526 may carry signals 528 and may be implemented using wire or cable, fiber optics, a telephone line, a cellular link, a radio frequency (RF) link, and other communications channels.

In this document, the terms "computer program medium" and "computer usable medium" are used to generally refer to media such as removable storage drive 514, a hard disk installed in hard disk drive 512, and signals 528. These computer program products provide software to computer system 500, wherein the present invention is directed to such computer program products.

Computer programs (also referred to as computer control logic), may be stored in main memory 508 and/or secondary memory 510. Computer programs may also be received via communications interface 524. Such computer programs, when executed, enable computer system 500 to perform the features of the present invention, as discussed herein. In particular, the computer programs, when executed, enable processor 504 to perform the features of the present invention. Accordingly, such computer programs represent controllers of the computer system 500.

In an aspect where the invention is implemented using software, the software may be stored in a computer program product and loaded into computer system 500 using removable storage drive 514, hard drive 512 or communications interface 524. The control logic (software), when executed by processor 504, causes processor 504 to perform the functions of the invention as described herein.

Figure 6:
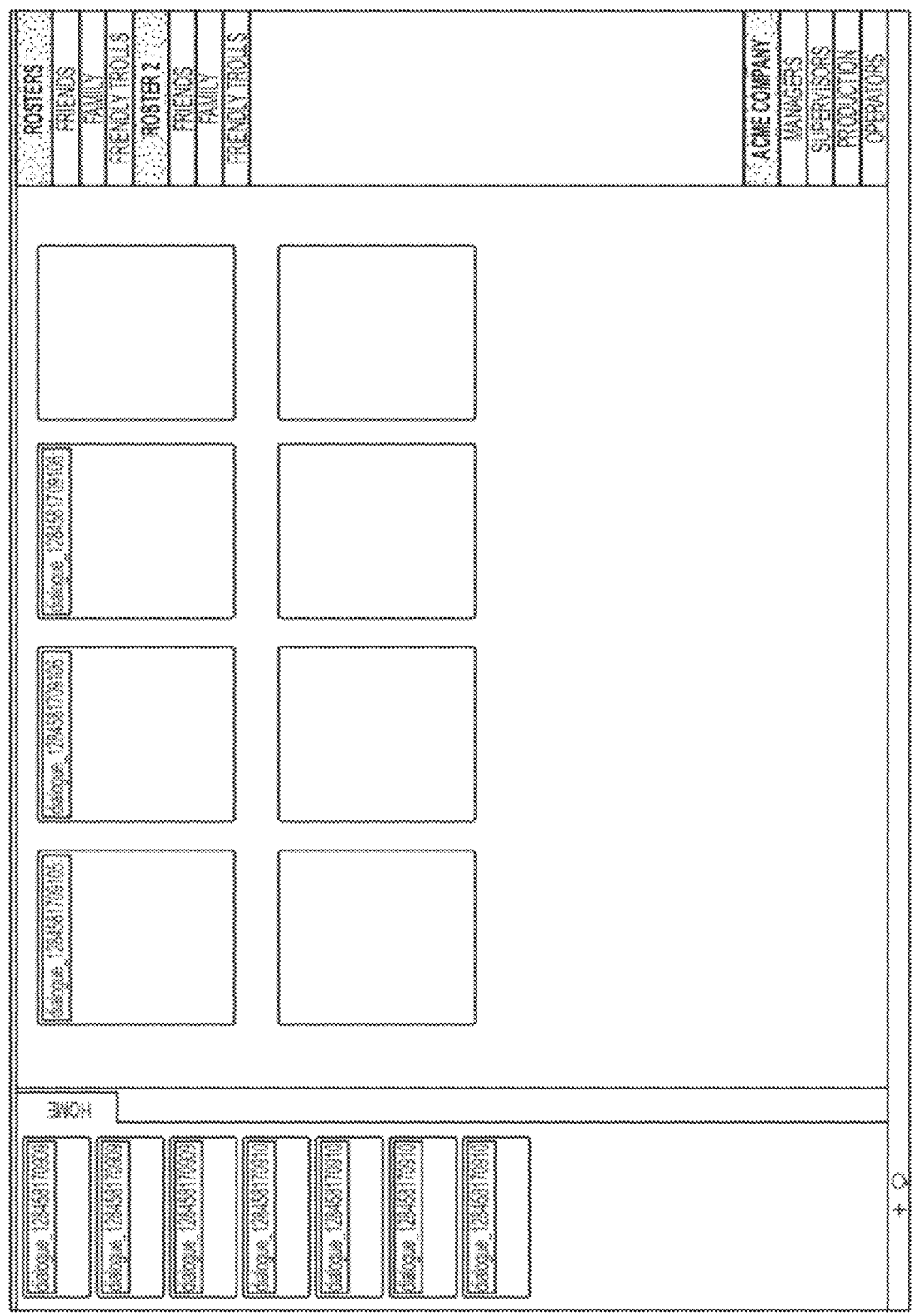
FIG. 6 is a diagram of how the basic user interface may look.

Elevator User Interface for List of Endpoints (see FIG. 6): There will be a user interface that will list all of the endpoints in list fashion in a single column.

Endpoints can be people who have received messages or people who have messaged in to contact the agent. The list will automatically arrange itself in a particular fashion. This will ensure that the user can tell which endpoints are still waiting on replies.

The list will constantly rearrange itself so that endpoints who have not been replied to in the longest time appear at the top of the list. This will ensure that the user can see which endpoints have messaged me and have waited the longest for me to reply to them, as well as which endpoints have never replied to the user's message or are considered "resolved" and can be listed at the bottom of the elevator column.

The aforementioned will perform as follows: the column lists endpoints who the user is in contact with, be they recipients of a mass-message or people who have messaged in looking for support of some kind.

The endpoints will appear in five different color-coded colors: red, yellow, green, gray and blue. The endpoints will have color-coding to determine how long it has been since they've last been replied to.

The amount of time will be user-settable, but the defaults will be:

Green: 30 seconds or less since the endpoint last replied but the user has not replied back.

Yellow: 1 minute or less since the endpoint last replied but the user has not replied back.

Red: over a minute since the endpoint has replied but the user has not replied back.

Gray: the user has replied but the endpoint has not replied back yet.

Blue: the endpoint has never replied

A user-settable sound cue will play for the following events: when an endpoint has been added to the elevator, when an endpoint moves up in priority, when an endpoint reaches red priority.

Recipients from the column can be moved to and from the column into the active area to the right of the column, either by drag and drop or by keyboard command.

The user will be able to set whether or not endpoints that have been moved to the active area will still appear in the elevator.

Statistics will appear at the top of the elevator that will tell the user the number of each color of endpoints.

If the user resizes the browser window, the elevator will extend vertically, becoming either taller or shorter depending upon how much space it has.

If there are more endpoints in the elevator than can be displayed in the browser window, the scroll bar to the right of the elevator will light up and allow the user to scroll down to see all endpoints.

The user will be able to delete endpoints from the elevator.

Figure 7:
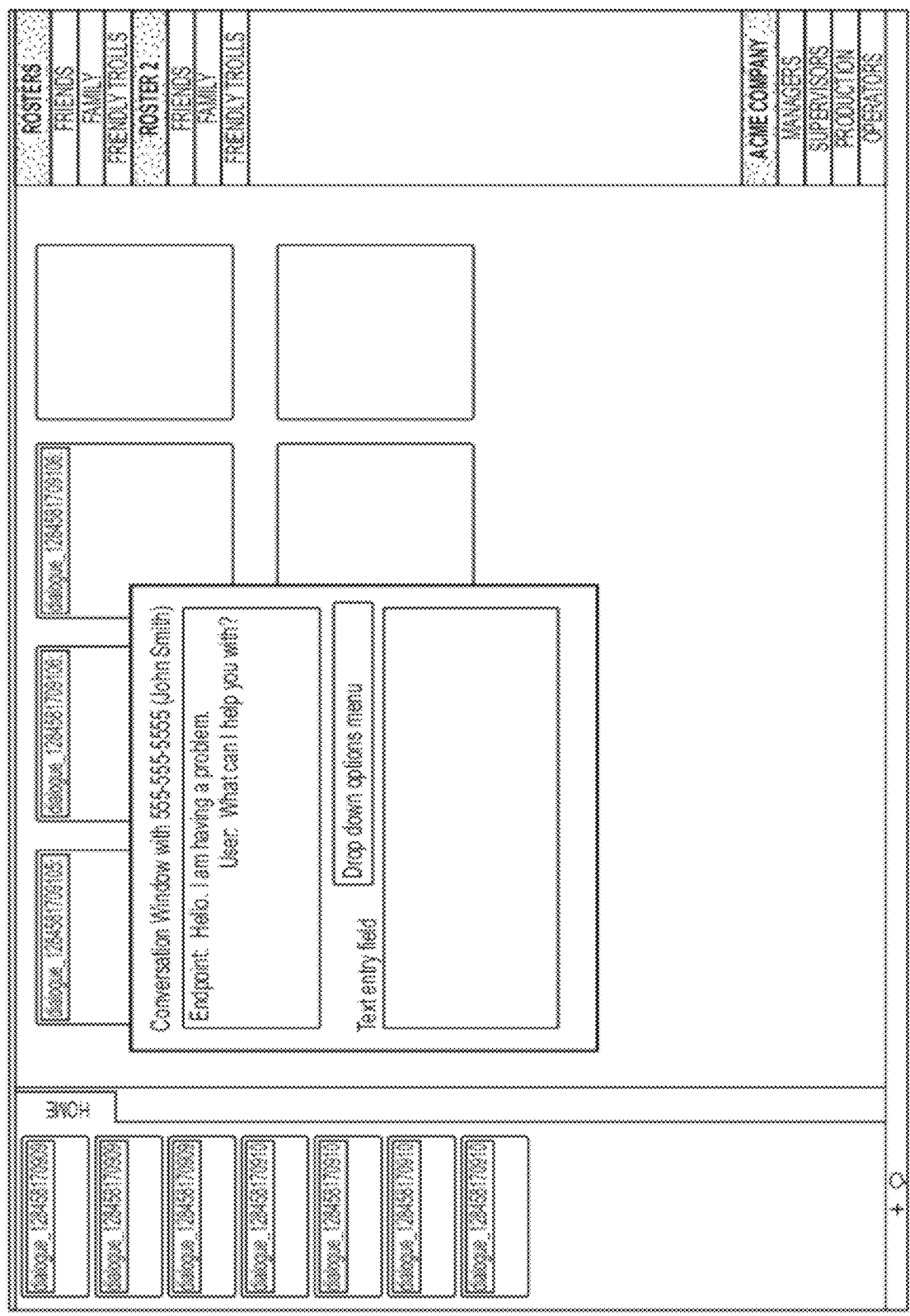
FIG. 7 is a diagram of an open conversation window.

Active Area User Interface (see FIG. 6 and FIG. 7): From the perspective of a user, there will be a section of the UI in which the user can arrange conversation boxes with endpoints as well as edit data about those endpoints and set their endpoint priority.

This will ensure the user can converse with endpoints in the active area as well as change their priority and edit their endpoint contact data.

The aforementioned will perform as follows: Each conversation box can be moved from the active area to the elevator and vice versa.

The border of each conversation box will be color-coded by priority of the endpoint.

Each conversation box can be expanded with options that will allow the user to change the priority of the endpoint, set the endpoint's contact information, send the endpoint back to the elevator or delete the endpoint.

The user will be able to scroll through all prior conversations ever had between any user who has ever talked to this endpoint (for the multi-user system in the future).

Roster Management User Interface: From the perspective of a user, the user needs to be able to create and edit a roster of other users, including setting permissions for those users so the user can control what messages are sent to them as well as what permissions they have in regards to message sending.

This will ensure that the user can manage a group of users from the top down. The aforementioned will perform as follows: The user can create user groups with adjustable permissions.

The user can enroll users in groups as the user see fit via means of checkboxes that will determine which groups they belong to (including belonging to multiple groups).

The user can send a message to specific groups (including multiple groups) via means of checkboxes.

The user can bulk-upload a list of users.

Figure 8:
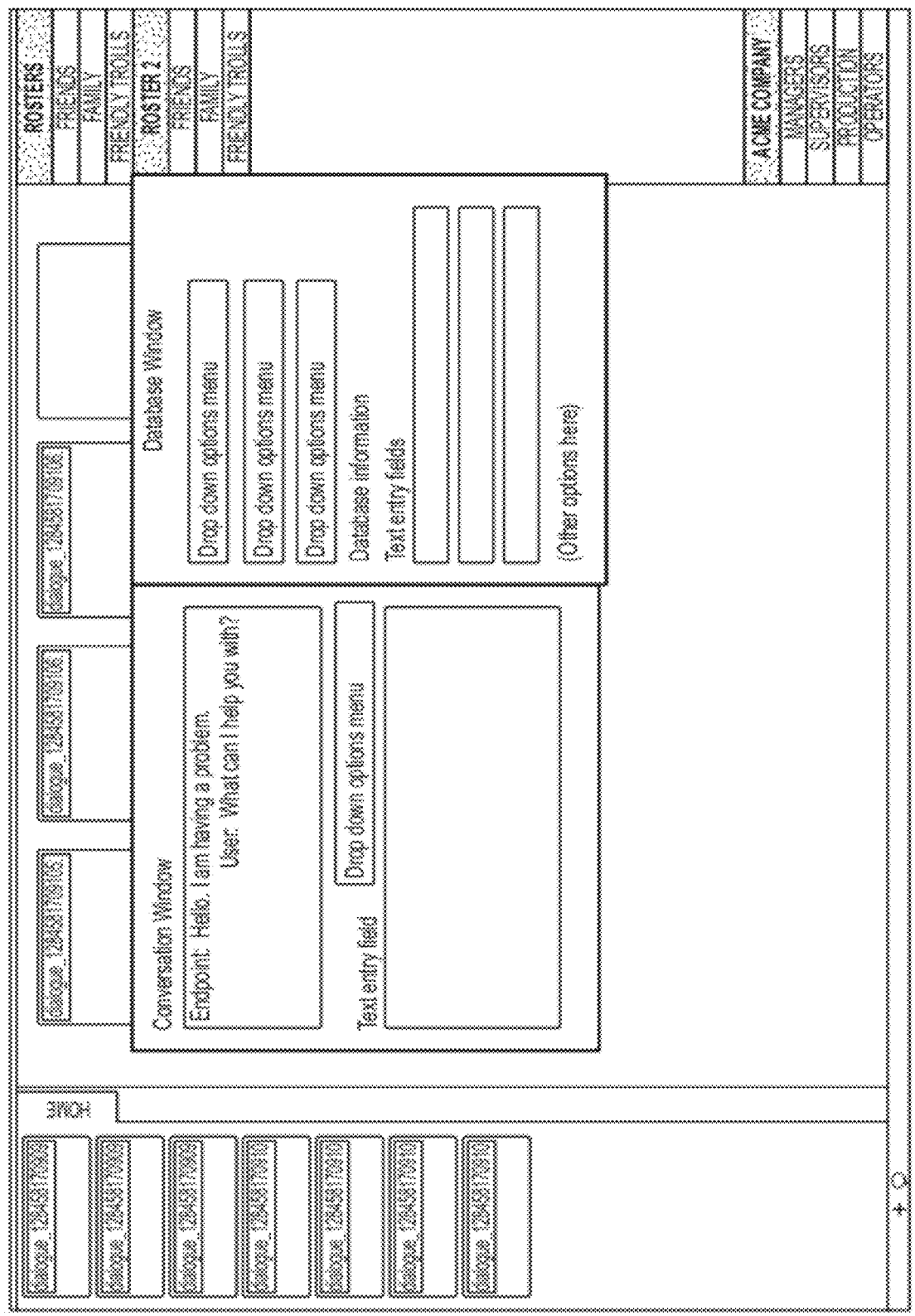
FIG. 8 is a diagram of an open conversation window with the expanded database options.

Manual Endpoint entering (see FIG. 8): From the perspective of a retail user, the user needs to be able to enter recipient info manually. This will ensure that the user doesn't have to deal with CSV formats when the user add endpoints to the system.

The aforementioned will perform as follows: The user can manually enter recipient information for an endpoint one at a time with the user interface.

Data will include endpoint nickname, full name and address, optional phone numbers, email, IM names Multi-user version of Message Dispatcher: From the perspective of a user, the user needs a multi-tiered Message Dispatcher that will allow me to manage multiple users and place them in various categories with varying permissions.

This will ensure that the user can manage all users with a top-down management system that gives me control over the permissions of other users. The aforementioned will perform as follows: The multi-tiered interface includes a system to add, delete and modify user accounts.

The interface allows the user in charge to create specific groups to add users to.

The interface allows the user in charge to edit permissions for usergroups.

The interface allows a single user to belong to multiple groups.

Endpoint Passing: From the perspective of a user, the user needs to be able to send endpoints to other users in the multi-user system. This will ensure that the user can put endpoints in contact with whichever other users or departments they need to talk to.

The aforementioned will perform as follows: The user can select endpoints from the elevator and move them to another user on the roster.

The user can select endpoints from the active area and move them to another user on the roster.

Upon sending an endpoint to another user, the user is given a dialog box in which the user can explain why the user is sending this endpoint to the other user.

Upon receiving an endpoint from another user, the user is seeing the explanation they sent.

Domain Branding: From the perspective of a user, the user needs to be able to change the theme/appearance of the user's message dispatcher site to be that of a corporate image or a licensee. This will ensure that the user can resell the message dispatcher service or have it set up with a specific corporate theme.

The aforementioned will perform as follows: users can set the appearance of the interface to have a certain theme and remove all Ameritext logos so that the message dispatcher service can be resold.

Text Conferencing: From the perspective of a user, the user needs to be able to conference multiple endpoints or other users together in a single conversation. This will ensure that the user can conference endpoints and/or users if necessary.

The aforementioned will perform as follows: The user can select the option to add another endpoint or user to a conversation via a drop-down menu on a conversation.

There will be a warning asking if the user is certain that the user wish to add this user/endpoint to the conference before they are added.

Double-clicking endpoints to move them to the active area: From the perspective of a user, the user needs to be able to double-click an endpoint and have that endpoint immediately move to the next available conversation box.

This will ensure that the user can quickly move endpoints into the active area. The aforementioned will perform as follows:

Double-clicking on and endpoint moves them to the next available conversation box. If no conversation boxes are free, the endpoint will not be moved.

Active Area Clean-Up by Color: From the perspective of a user, the user needs a way to organize the user's active area so that all of the conversation boxes with the highest priority are placed on top.

This will ensure that the user can quickly see which conversations need the user's attention at that time. The aforementioned will perform as follows: clicking a button above the active area will result in all conversation boxes in the active area being rearranged in the order of highest priority to lowest.

Active Area Fill Button: From the perspective of a user, the user needs a button at the top of the elevator UI that will fill all of the user's active area with as many conversations as it can fit. This will ensure that the user can quickly populate the user's active area with the endpoints with the highest priority.

The aforementioned will perform as follows: clicking a button at the top of an elevator will fill all vacant conversation boxes in the active area with endpoints from the top of the elevator, in order of highest priority to lowest.

Colored Backgrounds in Conversation Boxes: From the perspective of a user, the user needs the background text in conversation boxes to appear in different colors depending upon whether it was text from me or text from an endpoint.

This will ensure that the user can quickly and easily discern the user's text from the text send by endpoints. The aforementioned will perform as follows: the background behind text sent by users appears in a user-selectable color.

The background behind text sent by endpoints appears in a different user selectable color.

Database Integration: From the perspective of a user, the user needs a database to be integrated with the message dispatcher client that stores various data as generated. This will ensure that the user can access vital information about endpoints as well as use predetermined phrases in conversations.

The aforementioned will perform as follows: contact data about endpoints is maintained for retrieval by any user on the system (including endpoint nickname, full name and address, optional phone numbers, email, IM names)

Users will be able to select from a list of premade replies that will appear as they start typing in a conversation box (aka automatic field fill).

User-created basic Endpoint info (see FIG. 8): From the perspective of a user, the user needs a means of assigning information to users who text in.

This will ensure that the user can identify users based upon their issues/needs and stay up to date on who needs what.

The aforementioned will perform as follows: people who message in can be assigned basic identifying information to their incoming number The user info will include nickname, full name and address, optional phone numbers, email, IM names. This will also include a comment section where information about the person's reason for messaging in can be noted.

Dialogue Histories: From the perspective of a user, the user needs to be able to see the entire conversational history of each endpoint. This will ensure that the user will have full knowledge of that endpoint's interactions with me and other users whenever the user begin a conversation with them.

The aforementioned will perform as follows: the user can access the full history of the endpoint's conversation from the conversation box in the active area.

The dialogue will be stored in its entirety in the database for retrieval by the principle user or other users.

Searchable Dialogues: From the perspective of a user, the user needs to be able to search all conversation boxes for specific keywords at any time. This will ensure that the user can quickly and easily find specific conversations.

The aforementioned will perform as follows: the active area UI contains a search field.

Upon entering text into that search field, any conversation box that contains that keyword will become highlighted.

Upon selecting that conversation box, the user will be able to cycle through the list of instances of that keyword in the conversation.

Knowledge base for premade replies: From the perspective of a user, the user needs to be able to click on keywords in incoming messages and have a list of premade replies from the user's knowledge base pop up that the user can select from.

This will ensure that the user can more quickly reply to common questions asked by endpoints. The aforementioned will perform as follows: clicking on keywords brings up a list of premade responses.

Hitting a key closes the list.

The user can edit the list of premade replies via a separate interface.

The user can edit the knowledge base to include any number of replies the user want.

Voice conferencing: From the perspective of a user, the user needs to be able to conference in a number of endpoints. This will ensure that the user can talk via VoIP integration to multiple endpoints if and when necessary.

The aforementioned will perform as follows: the user can select a group of endpoints and choose to conference call them from a drop-down menu.

If the user is away from the office and using their mobile phone, the user can text a certain DID or a message to a certain DID.

This will cause the system to initiate a conference call to a group of contacts preselected by the user called a super group.

The user can choose to add additional endpoints to the call by selecting them from a drop-down menu.

Voice to text: From the perspective of a user, the user needs to use the user's microphone to speak text that will automatically be added to a conversation box. This will ensure that the user can more quickly reply to endpoints and send messages.

The aforementioned will perform as follows: the user can place the user's cursor over a conversation and speak into the user's microphone, resulting in the text appearing in that conversation box.

The user have the option of setting a specific button to activate speech to text for that box.

Text to voice: From the perspective of an endpoint, the user needs a way to be read the text that was sent to me by a user, even if the user don't have a SMS-capable device. This will ensure that the user can communicate with a user even without a SMS-capable device.

The aforementioned will perform as follows: sending a SMS message to a user with a non-SMS capable device will call their phone and speak the message instead.

Figure 9:
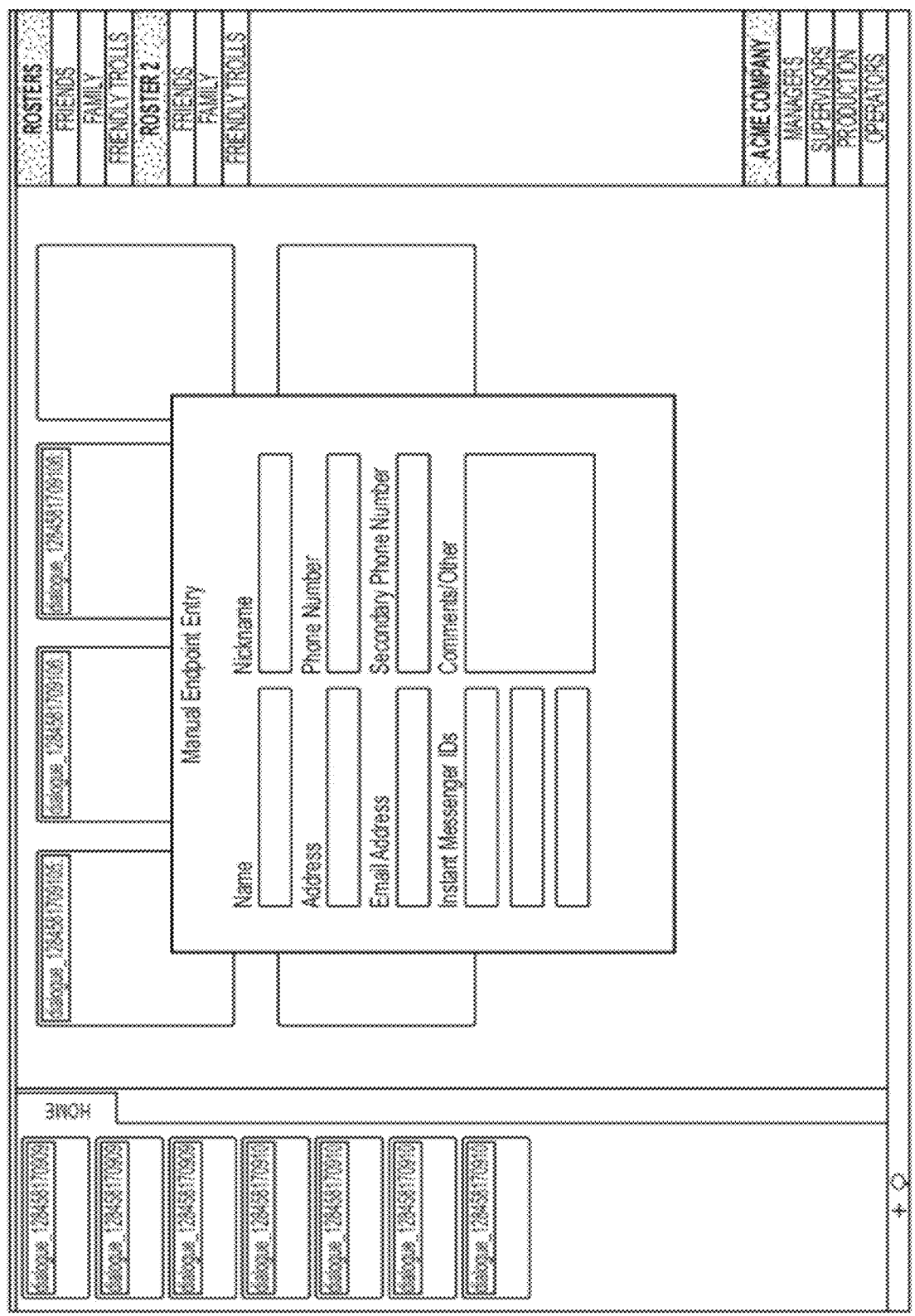
FIG. 9 is a diagram of manual endpoint entry.

Product ordering over SMS (see FIG. 9): From the perspective of a user, the user needs an interface that will allow me to open an order window from the conversation box with an endpoint. This will ensure that the user can take an order for the endpoint on the fly.

The aforementioned will perform as follows: the conversation box window will be linked to an order window where the user can place an order for the customer.

The system will be integrated with the ordering software in order to successfully take orders.

Appointment entering over SMS (see FIG. 9): From the perspective of a user, the user needs an interface that will allow me to open an appointment window from the conversation box with an endpoint. This will ensure that the user can schedule an appointment for the endpoint on the fly.

The aforementioned will perform as follows: the conversation box window will be linked to an appointment window where the user can schedule an appointment for the customer.

The system will be integrated with the appointment software in order to successfully schedule appointments for the endpoint.

Product information window (see FIG. 9): From the perspective of a user, the user needs a database entry window that is connected to the conversation box window with an endpoint. This will ensure that the user can access all the information on the endpoint's product, including premade replies and a list of common issues with the product.

The aforementioned will perform as follows:—the product information window can be accessed from the conversation box window and will open up alongside it. the product information window will have several drop down menus and search functions so the user can find the specific product the user needs information about.

The product information window will include a drop-down menu of premade replies specific to that product.

One-to-One Dialogue Concept #001 (see FIG. 7): From the perspective of a user, the user will want to be able to talk "IM-style" to an endpoint.

The user would like to be able to view the user's dialog in a conversational format. The user would also like to be able to scroll through the user's current dialogue and minimize or close it.

The aforementioned will perform as follows: the user can participate in a dialogue with the user's endpoint in a conversational style The user can close, minimize, or scroll through the user's dialogue One-to-One Dialogue Concept #002 (see FIG. 7): From the perspective of a user, the user will want to be able to talk "IM-style" to an endpoint. The user would like to be able to view the user's dialog in a conversational format.

The user would also like to be able to scroll through the user's current dialogue and minimize or close it. The aforementioned will perform as follows: the user can participate in a dialogue with the user's endpoint in a conversational style The user can close, minimize, or scroll through the user's dialogue One-to-One Dialogue Concept #003 (see FIG. 7): From the perspective of a user, the user will want to be able to go back to previous dialogues with the user's endpoint. The user would like to see the user's history only when the user will ask for it.

The user would also be able to look at the user's history as a reference while the user is communicating with the user's endpoint. The aforementioned will perform as follows: the user can see the user's endpoint's entire history in an organized manner The user can see an individual past dialogue next to the user's current dialogue One-to-Many Dialogue Concept #001: From the perspective of a user, the user will want to be able to send a one-to-many message (either an announcement or campaign) that is either sent immediately or scheduled for a later time.

The user should be able to select either a roster with a message or previously set-up campaign. The aforementioned will perform as follows: the user can create an announcement that the user can send to an entire roster either immediately or scheduled for later The user can schedule a campaign or send it right away One-to-Many Dialogue Concept #002: From the perspective of a user, the user will want to be able to create a campaign that can be manually sent or automatically set for a scheduled time.

The user want to be able to specify a roster, run-times, a message, if an elevator is automatically created, and the way replies are handled.

The aforementioned will perform as follows: the user can create a campaign

The user can schedule the user's campaign

The user can set the user's preferences for the user's campaign

The user can "set it and forget it"

One-to-Many Dialogue Concept #003: From the perspective of a user, the user will want to be able to set how the user's replies to announcements are handled.

The user want to be able to specify a number of options that will allow the user to handle contests, general announcements, campaigns, and any other type of announcement that the user choose.

The aforementioned will perform as follows: the user can specify how the user receive replies to the user's announcements, and how many.

Main UI Concept #001 (see FIG. 6): From the perspective of a user, the user will want to be able to manage the user's dialogues, rosters, announcements, and preferences from a single simplified interface. This will help the user to organize the user's dialogues and communicate more effectively and efficiently with the user's endpoints.

The aforementioned will perform as follows: the user can see the user's elevators, active area, rosters, and option icons in one area The user can manage the user's rosters, elevators, and preferences without leaving the user's workspace The user can reorganize the user's dialogues in the user's active area and elevator with a simple drag-and-drop action There are simple, clear icons that the user can click to add rosters, announcements, or edit preferences Main UI Concept #002 (see FIG. 6): From the perspective of a user, the user will want to be able to drag dialogues into the user's active area from the user's elevator and back.

The user will want to be able to organize the user's active area in any way the user choose based on the user's priorities. When the user want to focus on a particular dialogue it will grow larger and hover over the user's active area so the user can focus on it.

The aforementioned will perform as follows: the user's active area can receive dragged dialogues and will allow me to drag a dialogue from it to an elevator The user's active area can be organized in any fashion the user choose—

The user can open a dialogue that will cover and hover the user's active area so the user can focus on it Icon Concepts #001: From the perspective of a user, the user want to be cued to what method of communication the user's endpoint is using.

The user would like this in the form of a simplified icon. The aforementioned will perform as follows: the user have a set of icons that simply show me what method of communication the user is using with the user's endpoint Elevator UI Concept #001: From the perspective of a user, the user needs to be able to see the user's dialogues and have them sorted by importance and be able to scroll down to view the previous conversations.

This will ensure that the user can manage the user's dialogues with endpoints. The aforementioned will perform as follows: the user can see the user's dialogues in order of importance The user can scroll down to view all of the dialogues Elevator UI Concept #002: From the perspective of a user, the user needs to be able to view the user's dialogues in order of importance and be able to scroll up and down to view all dialogues.

The user also would like to see how many new messages have come in for each dialogue since the time the user have viewed with it. This will better help me manage the user's dialogues.

The aforementioned will perform as follows: the user can see the user's dialogues in order of importance The user can scroll up and down to view all of the dialogues The user can see how many messages have arrived for each dialogue since viewing it Elevator UI Concept #003: From the perspective of a user, the user needs to be able to view all of the user's dialogues, however, the user don't always want to see the text.

The user needs a minimal amount of information to know who the message is from, and how many messages each endpoint has sent since the user have last viewed the dialogue.

The aforementioned will perform as follows:—the user can "minimize" and "maximize" each dialogue in the user's elevator The user can see which endpoint each dialogue belongs to and how many messages the user have waiting from them Elevator UI Concept #004: From the perspective of a user, the user want to be able to preview what the highest few priority dialogues are saying by default. As dialogues become lower priority the user want them to automatically minimize so the user can view more conversations in the user's elevator.

This will help me view more dialogues in the limited space the user have. The aforementioned will perform as follows: the user's dialogues automatically maximize and minimize themselves based on their priority The user's top few priority dialogues are automatically maximized and the rest are minimized.

Elevator UI Concept #005: From the perspective of a user, the user want to scroll through the user's dialogues using a continuous scroll bar rather than buttons at the top and at the bottom. This will help me be more precise in navigating larger amounts of dialogues.

The aforementioned will perform as follows: the user can continuously scroll through the user's dialogues using a scrollbar on the side of the user's elevator Elevator UI Concept #006: From the perspective of a user, the user will want to be able to organize the user's dialogues into separate elevators.

The user want them to be organized into distinguishable announcements, campaigns, promotions, or any other grouping the user choose. The aforementioned will perform as follows: the user can organize the user's dialogues into multiple named elevators.

Elevator UI Concept #007: From the perspective of a user, not only would the user like multiple named elevators that the user can easily tell apart by name, the user would like a visual cue to be clear about which elevator the user is viewing.

The aforementioned will perform as follows: the currently selected elevator has a visual cue in order to distinguish that the user is viewing that elevator In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 5 may be configured as a desktop, a laptop, a server, a tablet computer, a PDA, a mobile computer, an intelligent communications device or the like. In yet another aspect, the invention may be implemented using a combination of both hardware and software.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A system for facilitating the communication of messages between a private branch exchange (PBX) and computing devices, comprising:
 a web server, coupled to a PBX communication system, configured to provide a user interface (UI) to at least one user, wherein said UI comprises an active area UI and a roster management UI;
 a message dispatcher client, coupled to said web server, capable of transmitting a plurality of text messages, via at least one network, between said UI and a plurality of computing devices utilized by a plurality of endpoints, wherein said message dispatcher client is capable of managing the permissions of said at least one user to utilize the system; and
 a message database, coupled to said message dispatcher client, configured to store activity data related to said plurality of text messages, wherein said message database is capable of categorizing, searching, and highlighting said activity data by at least one keyword;
 wherein the system allows said at least one user to efficiently and interactively engage in a high volume of two-way communications with said plurality of endpoints.

2. The system of claim 1, wherein said UI is configured to: display statistics related to said plurality of text messages; and color-code said plurality of text messages in response to input from said at least one user.

3. The system of claim 1, wherein said active area UI comprises a plurality of conversation boxes created by said at least one user to represent a corresponding one of said plurality of computing devices, wherein said conversation boxes are arrangeable by said at least one user according to one of: priority; category; and chronology.

4. The system of claim 1, wherein said roster management UI comprises at least one roster of other users of the system created by said at least one user, wherein said at least one user controls system permissions for each of said other users.

5. The system of claim 4, wherein said roster management UI is configured to allow said at least one user to move said other users within said at least one roster to a different roster.

6. The system of claim 1, wherein said message dispatcher client comprises themes and logos which are configurable based on input from said at least one user.

7. The system of claim 1, wherein said at least one network is one of: the global, public Internet; a CDMA network; a TDMA network; a radio network; and a GSM network.

8. The system of claim 1, wherein said activity data related to said plurality of text messages comprises: data input by said at least one user; and data collected from said plurality of computing devices.

9. A computer-implemented method for facilitating the communication of messages between a private branch exchange (PBX) and computing devices, comprising the steps:
 displaying, by a user interface (UI), dialogue inputted by at least one user and dialogue collected from a plurality of computing devices utilized by a plurality of endpoints, wherein said dialogue comprises conversations between said at least one user and said plurality of endpoints;
 transmitting, by a message dispatcher client coupled to said UI, via at least one network, a plurality of messages between said at least one user and said plurality of computing devices, wherein said plurality of messages is sortable by said at least one user for display on said UI; and
 storing, by a message database coupled to said message dispatcher client, dialogue input by said at least one user and collected from said plurality of computing devices for search and retrieval, wherein said message database categorizes said dialogue using identifying information selected by said at least one user.

10. The computer-implemented method of claim 9, wherein said UI is capable of displaying a plurality of icons, wherein each of said plurality of icons is indicative of the type of message said at least one user exchanges with said plurality of endpoints.

11. The computer-implemented method of claim 9, wherein said message dispatcher client is configured to send pre-made replies, according to one or more categories selected by said at least one user, to said plurality of computing devices.

12. The computer-implemented method of claim 9, wherein said plurality of messages transmitted by said message dispatcher client is scheduled by said at least one user by specifying a date and a time.

13. The computer-implemented method of claim 12, further comprising the step of:
 forming, from among said plurality of endpoints, a conference, wherein said conference is one of: a text dialogue and a voice dialogue.

14. The computer-implemented method of claim 12, further comprising the step of:
 synthesizing, from a voice message, text into a conversation box for display on said UI.

15. The computer-implemented method of claim 12, further comprising the step of:
 synthesizing, from a text message, speech to be read to said at least one user and to at least one of said plurality of endpoints.

16. The computer-implemented method of claim 12, further comprising the step of:
 collecting and transmitting appointment information from at least one of said plurality of computing devices to said at least one user.

17. A computer program product comprising a non-transitory computer usable medium encoded in a computer having control logic stored therein for causing the computer to facilitate the communication of messages between a private branch exchange (PBX) and computing devices, said control logic comprising:
 first computer readable program code means for causing the computer to display, by a user interface (UI), dialogue inputted by at least one user and dialogue collected from a plurality of computing devices utilized by a plurality of endpoints, wherein said dialogue comprises conversations between said at least one user and said plurality of endpoints;
 second computer readable program code means for causing the computer to transmit a plurality of messages between said at least one user and said plurality of computing devices via at least one network, wherein said plurality of messages is sortable by said at least one user for display on said UI; and third computer readable program code means for causing the computer to store dialogue input by said at least one user and collected from said plurality of computing devices for search and retrieval, wherein said dialogue is categorized by using identifying information selected by said at least one user.

18. The computer program product of claim 17, further comprising:

fourth computer readable program code means for causing the computer to send pre-made replies, according to one or more categories selected by said at least one user, to said plurality of computing devices.

19. The computer program product of claim 17, wherein said plurality of messages is scheduled for transmission by said at least one user by specifying a date and a time.

20. The computer program product of claim 17, further comprising:

fourth computer readable program code means for causing the computer to form, from among said plurality of endpoints, a conference, wherein said conference is one of: a text dialogue and a voice dialogue.

* * * * *